J. H. LONG.
WHEEL ATTACHMENT FOR DRAGGING LOGS AND HEAVY LOADS.
APPLICATION FILED DEC. 10, 1908.
925,780.
Patented June 22, 1909.
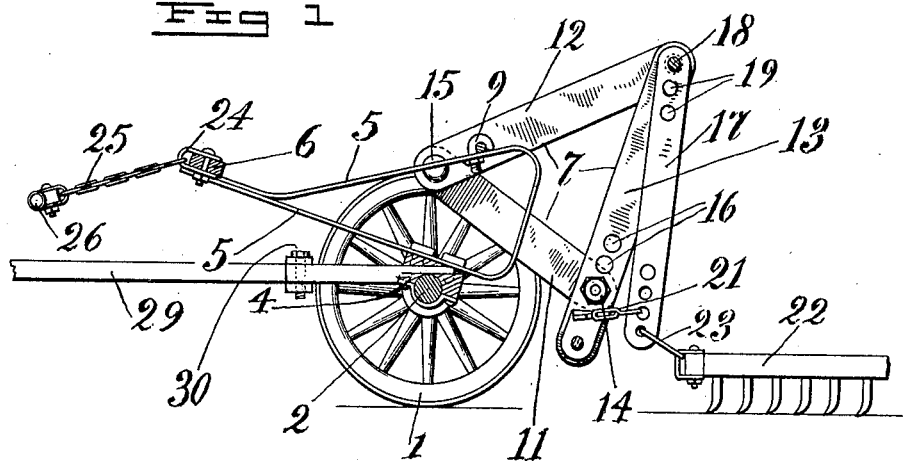
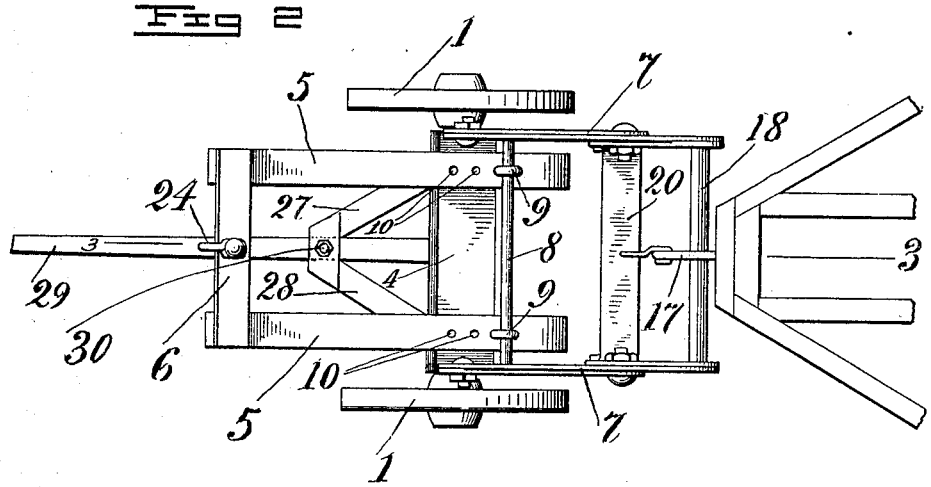
Witnesses
Inventor
James H. Long
By Edward M. Weeks
Attorney

UNITED STATES PATENT OFFICE.

JAMES H. LONG, OF JACKSONVILLE, ILLINOIS.

WHEEL ATTACHMENT FOR DRAGGING LOGS AND HEAVY LOADS.

No. 925,780.             Specification of Letters Patent.           Patented June 22, 1909.

Application filed December 10, 1908. Serial No. 466,773.

*To all whom it may concern:*

Be it known that I, JAMES H. LONG, a citizen of the United States, residing at Jacksonville, in the county of Morgan and State of Illinois, have invented certain new and useful Improvements in Wheel Attachments for Dragging Logs and Heavy Loads, of which the following is a specification.

This invention relates to a wheel attachment for drawing heavy logs, binders, harrows, plows and other drag loads, whereby the draft animals are enabled by means of a downward pull to impart a lifting action to the forward part of the drag load, thereby requiring less power to move a given load. And also when in going down grade the speed of the truck is greater than that of the draft animals, the log or other drag load is automatically lowered.

My invention consists in the constructions, combinations and arrangements herein described and claimed.

Referring to the accompanying drawings, forming a part of this application and in which similar reference symbols indicate corresponding parts in the several views: Figure 1 is a sectional view, of a machine embodying my invention, on line 3—3 of Fig. 2. Fig. 2 is a top plan view of a machine embodying the invention.

Referring to the drawings, 1, 1, indicate two wheels mounted on an axle 2 which is provided with a bolster 4,—attached thereto are the two looped members 5, 5, connected at their forward ends by the cross bar 6. Supported on the top of the looped members 5, 5, is the adjustable triangular frame 7, removably attached thereto by means of the screw hooks 9, 9, engaging the cross rod 8. Holes 10, 10, are provided to permit of several different adjustments.

The triangular frames 7, 7, are each composed of the three bars 11, 12, 13, secured by means of bolts 14, and 15, and the rod 18, and connected by means of the cross rods 18, and 8, and the connecting bar 20, and the shape of said triangles may be changed by employing any one of the several holes 16. To the cross rod 18, is attached the bar 17, which may be made adjustable by providing holes 19, or by any convenient form of clutch and may be movable either to the right or left or it may be omitted and a sliding block attached to the connecting bar 20. A connecting bar 20, extends between the two triangular frames 7, 7, and a link member 21, is provided to connect the cross bar 20, to the lower end of the bar 17. A harrow 22, is shown attached to the lower end of the bar 17, by means of the link member 23. The draft-animals are attached to the cross bar 6 by means of the link 24, the chain 25, and any convenient form of swingle-tree 26.

A tongue 29 is shown detachably secured to the axle 2 by means of the braces 27, and 28 and the bolt 30. The braces 27 and 28 are attached to the axle 2 so as to permit of a vertical movement on the part of the tongue 29, the tongue 2 being provided to facilitate the turning of the truck either to the right or left.

A seat for the driver may also be provided by placing a bar across the triangular frame, on the members 12, 12, or in any convenient manner on the bolster 4.

In operation, the log, binder, harrow or other load, intended to be dragged, is attached to the lower end of the bar 17, by means of a link or chain, which causes the lower end of the triangular frame 7 to rest near the ground, and also raises the forward end of the frame and the cross bar 6 to which the draft animals are attached. In starting and while being drawn forward, the pull on the bar 6, causes the frame composed of the looped members 5, to assume a more horizontal plane; this brings the cross rod 9 forward and upward at the same time raising the lower end of the triangular frame and lifting the forward end of any load or implement that may be attached thereto. This construction enables the draft-animals to give a lift to the load or harrow or other implement by means of a downward pull applied through the cross bar 6, thereby requiring less power than when the draft-animals are attached directly to the load or harrow or other implement which requires an upward pull attached in the ordinary manner as now in use. It also enables the draft-animals to start the load with greater ease, thereby enabling a less number to do the work. The pull being imparted entirely through the raised forward end of the frame 7, and the cross bar 6, a relaxing of the tension on the forward end of said frame allows the forward end of said load to immediately fall to the ground, thus automatically checking the speed of the truck.

Having described my invention, what I claim as new and desire to secure by Letters Patent, is:—

1. A draft truck comprising a pair of wheels and an axle, a lever frame secured to and above said axle, said axle serving as a fulcrum for said lever frame, the forward end of said frame lying normally above the horizontal plane of said axle, means to attach draft animals to the forward end of said lever frame, and means to attach a drag load to said lever frame, whereby the forward end of the drag load is lifted by the forward and downward pull of the draft animals upon the forward end of the lever frame, and automatically lowered upon the relaxing of said pull.

2. A draft truck comprising a pair of wheels and an axle, a lever frame secured to and above said axle, said axle serving as a fulcrum for said lever frame, the forward end of said frame lying normally above the horizontal plane of said axle, means to attach draft animals to said lever frame, a swinging frame attached to said lever frame and means to attach a drag load to said swinging frame, whereby the forward end of the drag load is lifted by the forward and downward pull of the draft animals upon the forward end of the lever frame and automatically lowered upon the relaxing of said pull.

In testimony whereof I affix my signature in presence of two witnesses.

JAMES H. LONG.

Witnesses:
J. MARSHALL MILLER,
WM. E. THOMSON.